J. COMLY.

Improvement in the Manufacture of Gear-Wheels.

No. 132,899. Patented Nov. 12, 1872.

WITNESSES
Thomas J. Bewley
Isaac Rindge

INVENTOR.
John Comly
By His Attorney
Stephen Ustick

UNITED STATES PATENT OFFICE.

JOHN COMLY, OF WILLIAMSBURG, NEW YORK.

IMPROVEMENT IN THE MANUFACTURE OF GEAR-WHEELS.

Specification forming part of Letters Patent No. 132,899, dated November 12, 1872.

*To all whom it may concern:*

Be it known that I, JOHN COMLY, of Williamsburg, in the county of Kings and State of New York, have invented certain Improvements in Forming the Teeth of Gear-Wheels, of which the following is a specification:

My invention relates to the combination of a circular die with a blank-wheel placed on a mandrel in such a manner that as the die is revolved by suitable mechanism it forms teeth on the wheel as the latter is caused to revolve by the revolution of the die. The teeth are made for spur, bevel, or any other desired form of gearing, by constructing the teeth of the die of corresponding form. The blank-wheel, before being placed on the mandrel, is brought to a red heat to give practicability to the perfect formation of the teeth. There is a water-trough connected with the lower edge of the die for the purpose of cooling its teeth, after they pass the hot wheel, successively.

Figure 2:
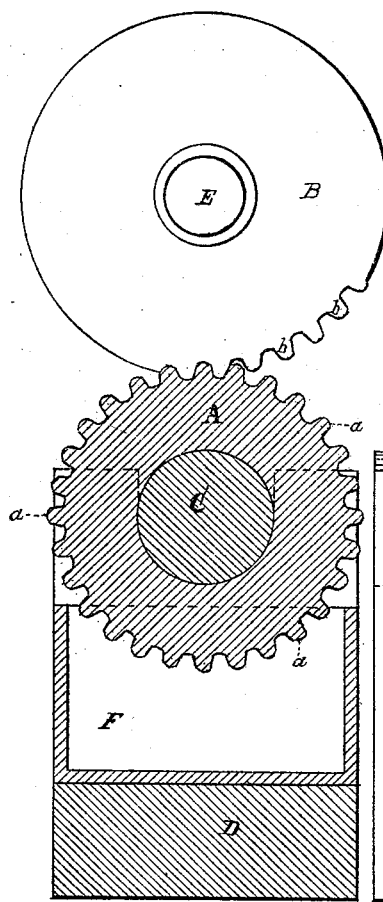
Figure 1:
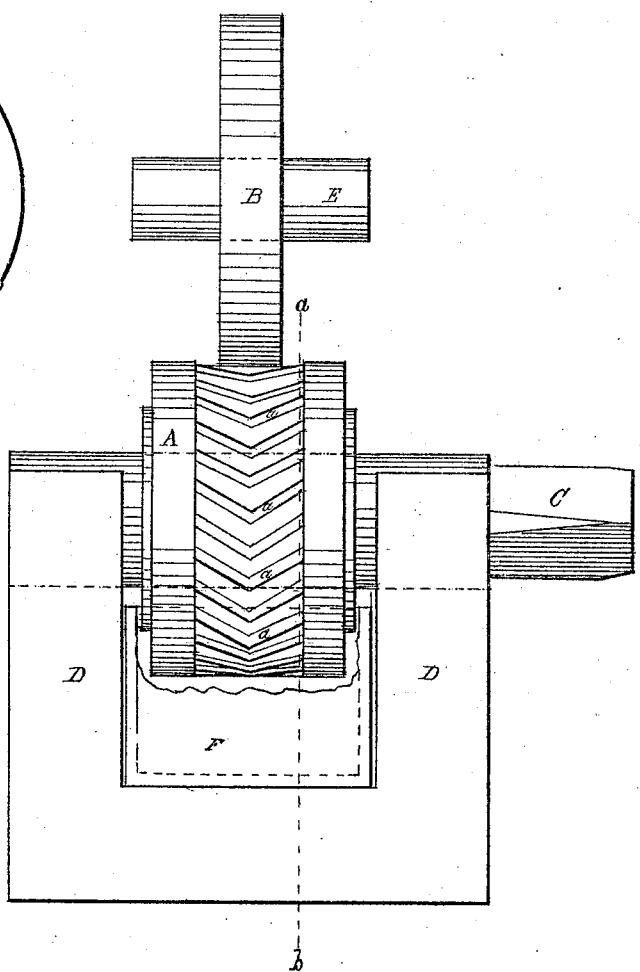

Figure 1 is a front elevation of the frame D, cooling-trough F, revolving die A, and wheel B. Fig. 2 is a vertical section at the line *a b* of Fig. 1.

Like letters in both figures indicate the same parts.

A represents a circular die, having zigzag teeth *a* on its periphery for pressing into shape teeth *b* on the periphery of the wheel B as the two wheels are caused to revolve by power applied to the shaft C of the die by means of a crank or otherwise, the journals of the shaft being supported by the frame D, and those of the mandrel E, on which the wheel B is placed, by any suitable means.

The wheel or disk B is brought to a red heat before it is brought into position, as shown in the drawing, to admit of the teeth *a* of the die A pressing easily into its periphery and forming the teeth *b*. The die is cooled, as it revolves, by its under edge running in the water-trough F.

It will readily appear that any form of teeth may be constructed in the manner above described by making the teeth of the die A of the required form, and that the teeth of the wheels, in consequence of being greatly condensed by the action of the die, will be much stronger than when formed by a cutting-machine or in the casting.

I claim as my invention—

The combination of the circular die A, blank-wheel B, mandrel E, and water-trough F, substantially in the manner and for the purpose set forth.

JOHN COMLY.

Witnesses:
ARTHUR BASSETT,
CHARLES COMLY.